United States Patent
Ezra et al.

(10) Patent No.: US 7,216,336 B1
(45) Date of Patent: May 8, 2007

(54) SEQUENTIAL EVENT MONITORING MODULE

(75) Inventors: Josef Ezra, Ashland, MA (US); Ohad Zeliger, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 559 days.

(21) Appl. No.: 10/375,991

(22) Filed: Feb. 28, 2003

(51) Int. Cl.
*G06F 9/45* (2006.01)

(52) U.S. Cl. ........................................ 717/124
(58) Field of Classification Search .............. 717/129, 717/124
See application file for complete search history.

(56) References Cited

U.S. PATENT DOCUMENTS

| | | | |
|---|---|---|---|
| 6,202,199 B1 * | 3/2001 | Wygodny et al. ........... 717/125 |
| 6,275,956 B1 * | 8/2001 | On et al. .................... 717/125 |
| 6,470,388 B1 * | 10/2002 | Niemi et al. ................ 709/224 |
| 6,539,501 B1 * | 3/2003 | Edwards ...................... 714/45 |
| 6,697,969 B1 * | 2/2004 | Merriam ...................... 714/46 |
| 7,093,169 B2 * | 8/2006 | Merriam ...................... 714/47 |
| 2002/0087949 A1 * | 7/2002 | Golender et al. ........... 717/124 |
| 2002/0100023 A1 * | 7/2002 | Ueki et al. .................. 717/127 |
| 2003/0212750 A1 * | 11/2003 | Butt .......................... 709/208 |

* cited by examiner

*Primary Examiner*—John Chavis
(74) *Attorney, Agent, or Firm*—Daly, Crowley, Mofford & Durkee, LLP

(57) ABSTRACT

A debugger mechanism that provides for debugging source code of a target by correlating messages in a log file associated with source code with corresponding lines of the source code.

32 Claims, 5 Drawing Sheets

SEQUENTIAL EVENT MONITORING MODULE

BACKGROUND

The invention relates generally to software debugging tools.

Software debuggers such as the GNU debugger allow a user to debug a running program in a setup where the platform running debugger software itself (the debugger system) is connected to the platform running the application being debugged (the target) via a serial port, network connection or some other means. For multiple active targets (for example, debugging of code on multiple CPUs in a multi-processing target environment), conventional debugging solutions must maintain and use symbol tables, typically one for each of the targets. Thus, such solutions require access to active programs and significant memory capacity to support multiple sessions.

SUMMARY

In one aspect, the invention provides methods and apparatus, including computer program products, for debugging code. The methods include accessing a log file associated with a source file in a target system, correlating a message in the log file to corresponding source code in the source file and displaying the corresponding source code.

Embodiments of the invention may include one or more of the following features.

The display of the corresponding source code can include the display of such corresponding source code in association with the message.

The log file can be accessed remotely via a network connection to the target system.

The message can identify an event and provide a source code identifier corresponding to that event.

The correlation can involve matching the message to source code identified by the source code identifier. The source code identifier can include a source code line number.

The log file can include multiple messages. Where the target system supports multiple inter-related processes each corresponding to a different source file and producing a log file, debugging code can further include initiating debug sessions involving each different source code and log file, and switching between two of the debug sessions. Switching between the two debug sessions can include time correlating messages in the log files involved in the two debug sessions. The target system can also support threads executing the source code, each thread contributing to the messages in the log file. The correlation for the multi-threaded target system can correlate each message in the log file for a selected one of the threads to corresponding source code in the source file.

The log file can include other information, such as thread states and variable values.

Particular implementations of the invention may provide one or more of the following advantages.

The present invention provides a mechanism that allows a user to re-create the execution path of a program that is no longer running. This type of debug does not interfere with the scheduled execution of the program, for example, at a customer site, as it examines the program's log file. Also, the automatic correlation of source code with log file messages during a debugging session reduces the amount of time required to follow a path of execution and correctly identify a sequence of events that lead to a particular problem. The mechanism is applicable to and provides benefits relative to both multi-process and multi-threaded system environments. In particular, multiple inter-related processes can be correlated in time in order to follow a path of execution of a process that involves interaction with other processes, and the sequence of events for a single execution thread of a multi-threaded process can be followed as well. The mechanism extends the use of conventional log files, which are augmented with enough information to correlate events corresponding to messages in the log files to the source code lines that caused such events to occur.

Other features and advantages of the invention will be apparent from the following detailed description and from the claims.

DESCRIPTION OF DRAWINGS

Like reference numbers will be used to represent like elements.

DETAILED DESCRIPTION

Figure 1:
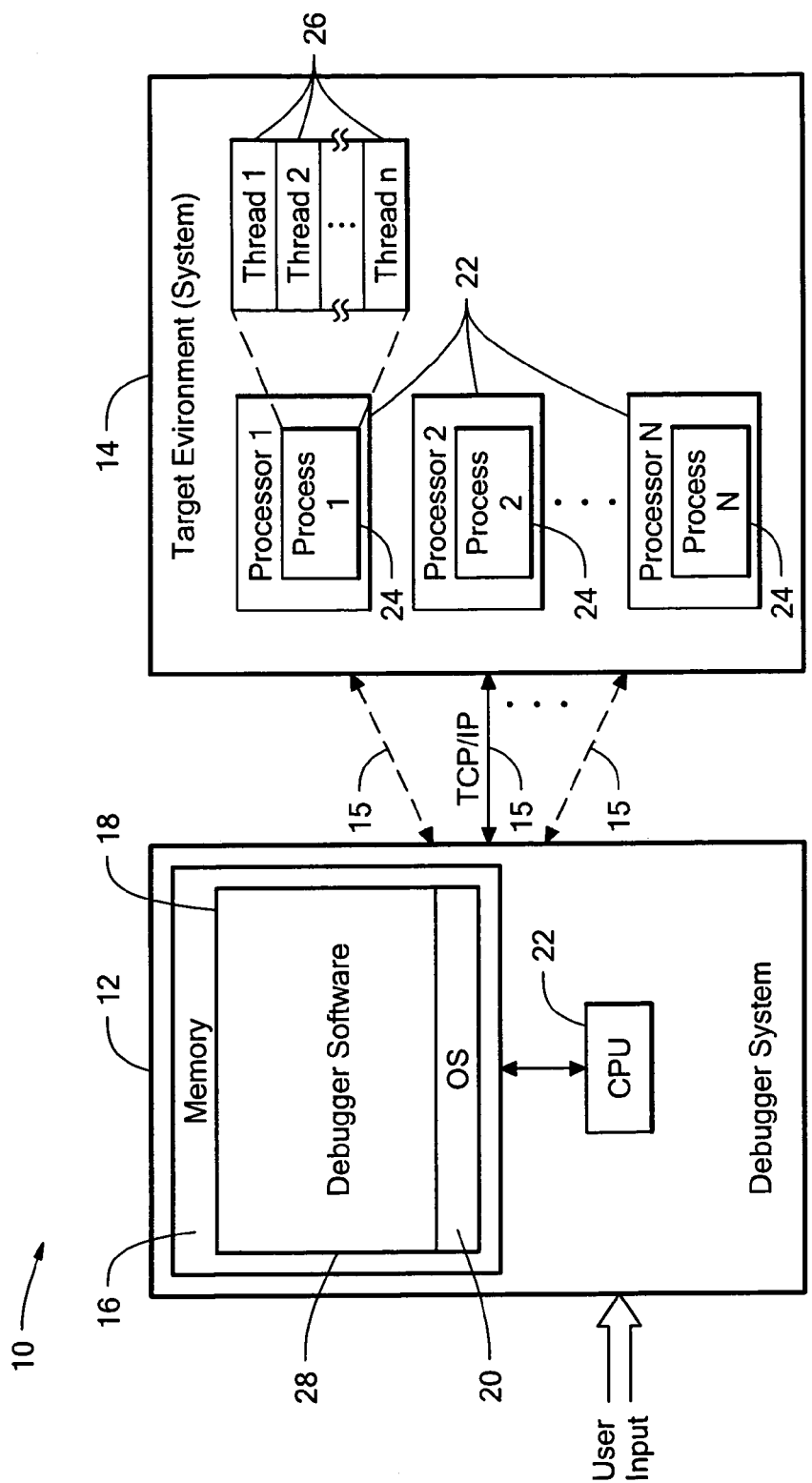
FIG. 1 is a block diagram depicting a multi-processing, remote debugging environment employing a debugger system that correlates source code log file information with corresponding source code.

FIG. 1 shows a remote program debugging environment 10. Included is a debugger system 12 coupled to a target system or environment 14 via one or more interconnections 15. The system 14 executes application code to be debugged by the debugger system 12. The interconnection 15 may be implemented as a serial bus, or TCP/IP connection (over a network, for example, the Internet). The debugger system 12 includes a memory 16 for storing upper-level debugger software 18 and lower-level software 20, such as an Operating System (OS), as shown. The system 12 further includes a CPU 22 that executes the software 18 and 20. Preferably, although not shown, the debugger system 12 further includes any hardware and additional software to support all logic needed to control and display the output of a debug session, communicate with the target environment 14 (using whatever interconnection 15 is selected), as well as support I/O interactions with a user of the system 12. Also, it will be understood that the debugger system 12 maintains in memory 16 any source files for code to be debugged.

The system 14 is a multi-processor system. In one embodiment, the system 14 includes one or more processors 22, shown as processors 1 through "N", where "N" is the total number of processors available in the system 14. The processors 22 can be implemented as or reside on different computer systems, or, alternatively, can be different devices on a single system. The processors 22 each support execution of a process (or program) 24. The processors 22 can run different programs or instances of the same program. A given process 24 can be implemented as a plurality of executions threads 26, for example, as shown with respect to process 1, threads 1 to "n", where "n" is the total number of available threads.

Figure 2:
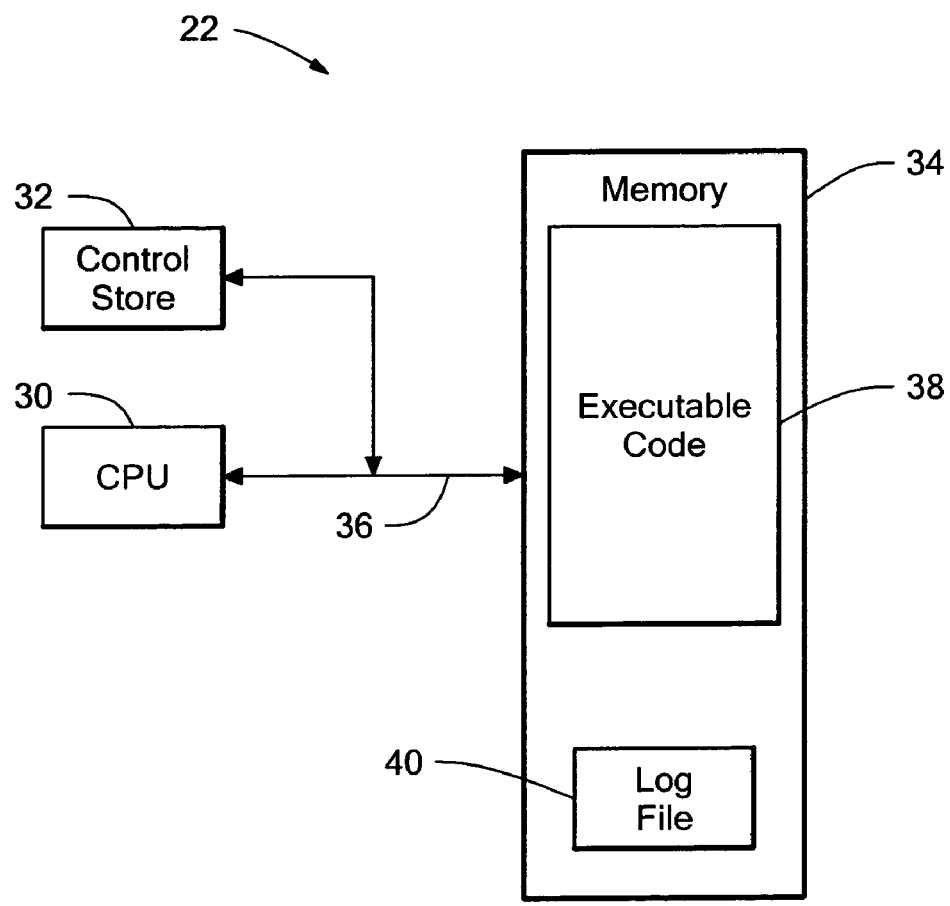
FIG. 2 is a block diagram of a single system or processor (within the multiprocessing environment of FIG. 1) that stores and executes source code to be debugged.

In one exemplary embodiment, and as shown in FIG. 2, each of the processors 22 includes a CPU 30 coupled to a control store 32 and a local, nonvolatile memory (NVM) 34 by an internal bus 36. The CPU 30 controls the overall operations of the processor 22 and communications with the memories 32 and 34. The local memory 34 stores executable code 38, which includes a binary file (.BIN file). The code 38 is read each time the system 14 is initialized. The code 38, which defines the functionality and operation of the processor 22, is copied into the control store 32 at initialization for subsequent execution by the CPU 30 (as process 24). Further included in the memory 34 is a log (or trace) file 40, which is produced by the system 22. The log file 40 is written with debug information associated with the execution of code lines of the code 38, e.g., error and other event messages, used by the debugger system 12, as will be described. The event message can correspond to any point of execution that was of interest to the program developer.

Returning to FIG. 1, prior to commencing a debug session on a target, the debugger system 12 establishes a connection between the debugger system 16 and the target system 14. Once the connection has been established, and when a user is running the debugger software on a physically separate system, or controlling a standalone system over a serial port or a real-time system over a TCP/IP connection, as shown in FIG. 1, the user can begin remote debugging by remotely accessing the log files 40 of the processors 22. Because the debugger system 12 operates on a log file of a program that is no longer executing, the debugger system 12 need not maintain and use target symbol tables in the manner of conventional remote debugger tools.

Typically, to begin debugging, the user runs the debugger software 18 on the system 12, and specifies a source file of a program to be debugged. This information tells the debugger 18 how to locate the appropriate log file for that program. Typically, and as mentioned above, the log file is accessed remotely by opening the log file stored on the processor 22. The debugger 18 specifies how to communicate with the specific target—either via a device name attached to a direct serial line, or a TCP port. Type or protocol of a target machine, as well as parameters like device names or host names to connect with, process numbers, baud rates, and so forth, may also be specified. In one implementation, the debugger software can open multiple log files (during multiple debugging sessions) and generate pointers to those log files to facilitate remote access. In alternative implementations, the log file may be copied to the debugger system for local access. Although FIG. 1 shows a remote debug set-up, it will be appreciated that the application program to be debugged could reside on the same system as the debugger software 18.

Figure 3:
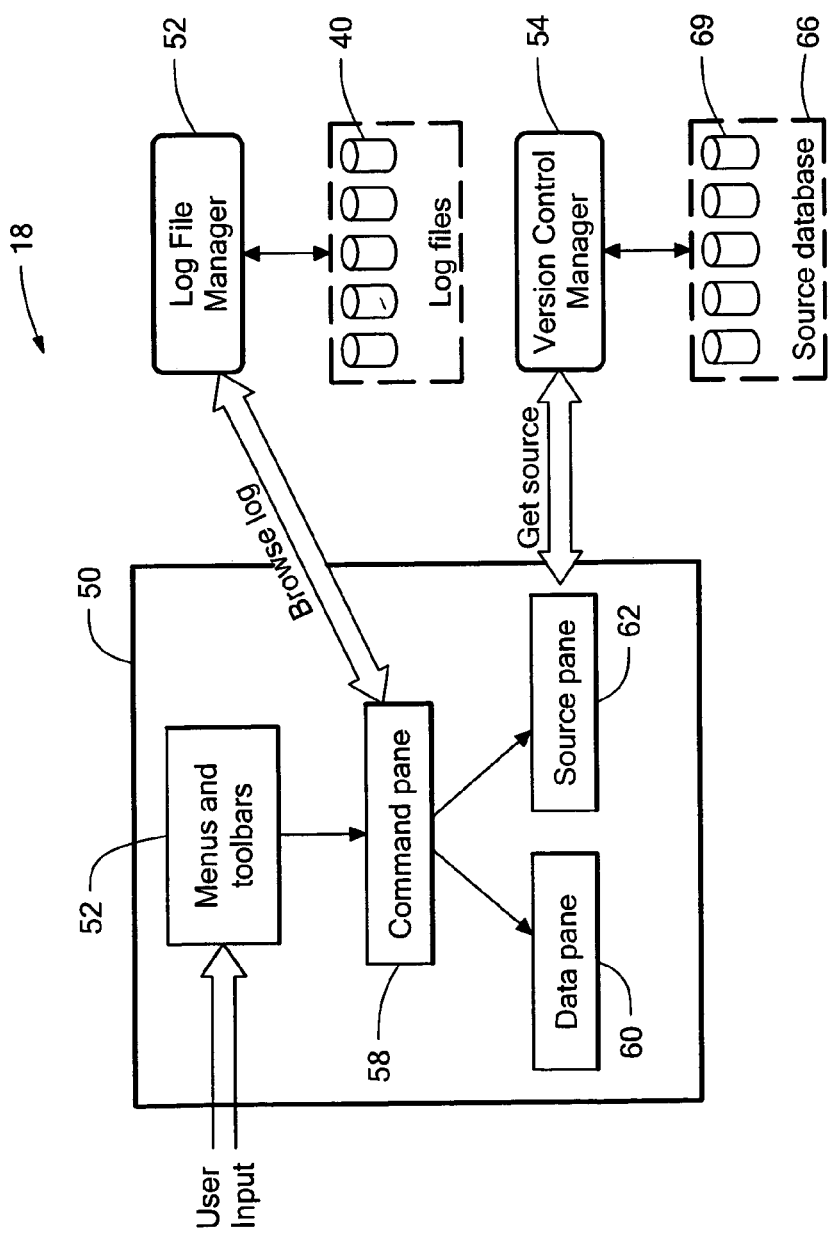
FIG. 3 is block diagram of the debugger system (of FIG. 1).

Referring to FIG. 3, the debugger 18 includes the following software components: a graphical user interface (GUI) 50; a log file manager 52 and a version control manager 54. The GUI 50 includes the following modules: user option devices, e.g., menus and toolbar buttons 56, command pane 58, data pane 60 and source pane 62. The command pane 58 allows the user to navigate the execution trace. It creates and manages connections to log files 40 (via the log file manager 52), and passes commands to the other GUI modules. The data pane 60 is responsible for displaying a particular log file (as well as administrative data, e.g., debug session errors), while the source pane 62 handles the display of the source code that corresponds to the log file displayed in the data pane 60. In particular, the source pane 62 provides a highlighted display of that portion of the source file, e.g., the source file/line, corresponding to the first message displayed in the data pane 60. Through the command pane 58, the user can traverse the messages in a log file (e.g., by pressing the Next/Prev key or other message selection mechanism), thereby selecting the source code (in one embodiment, the source code line corresponding to the selected message) to be displayed and highlighted by the source pane 62. Those selections are received as requests by the source pane 62, which in turn obtains (via the version control manager 54) and formats the appropriate source code for display.

The log file manager 52 handles the log files 40 residing on the remote target system 14. The log file manager 52 is responsible for opening, closing, parsing and navigating the log files 40. The log file manager 52 receives commands for log file information from the command pane 58 and, in response, returns log messages and related information (for example, names of threads that contributed messages to a log file) to the command pane 58.

The version control manager 54 manages copies of source files 64. It retrieves the correct version of the source code of interest from a source repository or database 66 (stored in debugger system memory 16, shown in FIG. 1).

In one embodiment, as indicated earlier, the user is allowed to choose from among multiple log files opened from the debugger system 12. The user can switch from one log file to another via a menu option. Once the log file is chosen, the correct source file is also opened and displayed.

Figure 4:
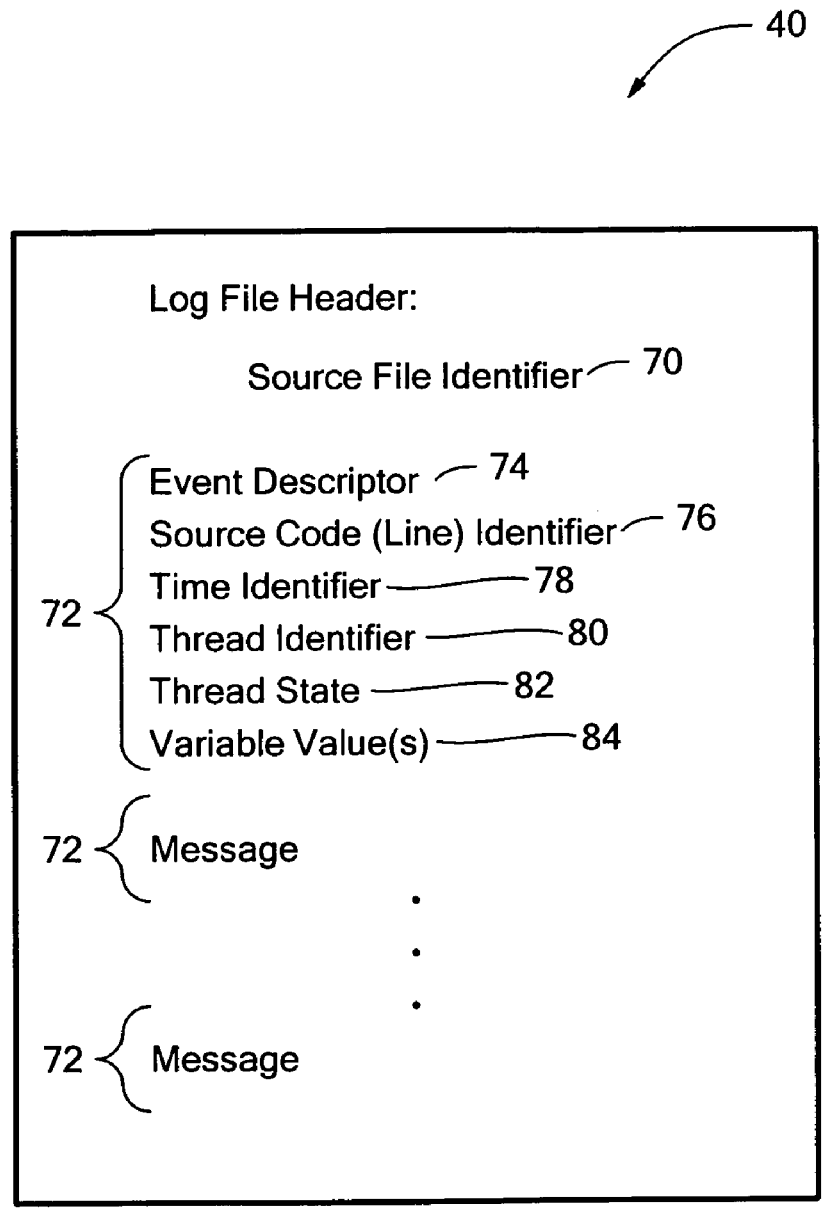
FIG. 4 is a depiction of an exemplary format of a log file (from the system of FIG. 2) used by the debugger system for remote debugging.

FIG. 4 shows an exemplary format of log file 40. In the example shown, the log file includes header information identifying the source file by name or other identifier 70 and possibly other information as well, e.g., the version of the program, for interaction with the version control manager 54 (from FIG. 3). The log file 40 further includes one or more messages 72. Each message 72 is formatted to include: a message/event descriptor or code 74 to indicate an error or event that occurred while a source code was executing; and a source code identifier, shown as a source code line identifier 76 to identify the number of the exact line of the source code file identified by the source file name/identifier 70 that caused the error or event indicated by the message/event descriptor 74 (and, therefore, the generation of message 72). In addition, each message 72 can include time information indicating the time when the message issued (time identifier 78), thread identifier 80 (if applicable) and any other information of interest for debugging purposes, such as thread state 82, one or more variable values 84, and so forth. At minimum, however, for correlation purposes, the log file need only include enough information to enable the debugger software 18 to identify the source code responsible for a given message, such as a source code line number.

Figure 5:
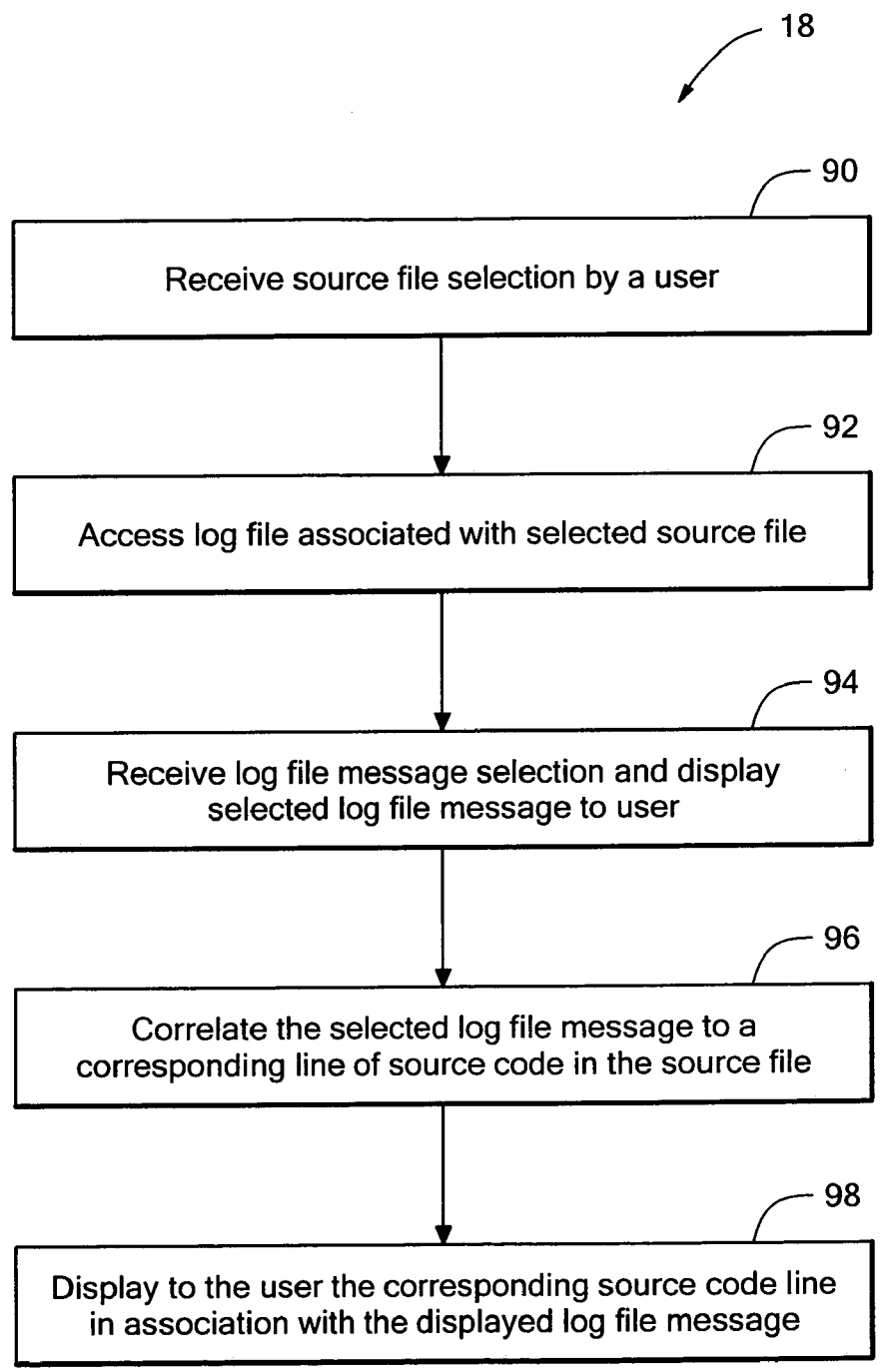
FIG. 5 is a flow diagram of the operational flow of the debugger software (of the debugger system of FIG. 3) during a debugging session.

Referring now to FIG. 5, a general overview of the operation of the debugger software 18 during a debugging session is shown. The debugger 18 receives a source file selection from a user (step 90) and in response, accesses the associated log file from the target system (step 92). Alternatively, the user could specify the log file directly. The debugger 18 receives a log file message selection and displays the selected log file message (step 94). The debugger 18 correlates the selected message (using the source code line identifier 76, illustrated in FIG. 4) to a corresponding line of source code from the source file stored in the source database (step 96) and displays the corresponding source code line in association with the displayed message (step 98).

The debugger software 18 provides for time-based correlation as well. This may be particularly desirable in debugging code corresponding to inter-related processes, such as client/server processes. For time-based correlation, the debugger software 18 correlates the messages to source code lines according to the time the messages occurred, for example, using the message time identifiers 78 from the log files. The debugger software 18 synchronizes the times of the log files of the different processes since these times are different from processor to processor.

Referring to FIGS. 1–4, for multi-threaded processing in which each thread 26 contributes messages to a single log file 40, the log file manager 52 parses the log file to identify the contributing threads (via thread identifiers 80) and passes a list of the identified threads to the command pane 58, which makes the information available to the user. Consequently, the user can select a particular thread and therefore select only those messages corresponding to that thread, enabling the user to follow the execution path of a process on a thread-by-thread basis (via the sequence of events in the log file messages for a selected thread).

In addition, the debugger software 18 allows a user to select a line from a source file and view a corresponding message from a log file if a match (based on line number) is found.

Other log file debugging activities are supported as well. For example, the debugger software 18 can allow a user to perform textual searches of log files or query log files by thread or time or any other field or combination of fields that correspond to different information provided in the log files. In a remote debugging environment, the debugger software 18 can access a remote agent or process (residing on the target system) via a network or other connection, and enable that agent to query a log file. The results of such log file queries can then be used to perform source code line correlation, as described above.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of debugging code, comprising:
    accessing a log file in a target system from a remote site, the log file being associated with a source file in the target system, the source file representing a non-active program;
    correlating a message in the log file to corresponding source code in the source file; and
    displaying the corresponding source code to enable debugging of the corresponding source code;
    wherein accessing the log file in the target system from the remote site comprises remotely accessing the log file through a network connection to the target system by enabling, from the remote site, an agent in the target system to query the log file.

2. The method of claim 1 wherein displaying comprises displaying the corresponding source code in association with the message.

3. The method of claim 1 wherein the message identifies an event and provides a source code identifier corresponding to the event.

4. The method of claim 3 wherein correlating comprises:
    matching the message to source code identified by the source code identifier.

5. The method of claim 4 wherein the source code identifier comprises a source code line number.

6. The method of claim 1 wherein the log file comprises multiple messages.

7. The method of claim 6 wherein the target system supports multiple inter-related processes each corresponding to a different source file and producing a log file, further comprising:
    initiating debug sessions involving each different source code and log file; and
    switching between two of the debug sessions.

8. The method of claim 7 wherein switching between the two debug sessions comprises:
    time correlating messages in the log files involved in the two debug sessions.

9. The method of claim 6 wherein the target system supports threads executing the source code, each thread contributing to the messages in the log file.

10. The method of claim 9 wherein correlating further comprises:
    correlating each message in the log file for a selected one of the threads to corresponding source code in the source file.

11. The method of claim 10 wherein the log file further includes states associated with the threads.

12. The method of claim 3 wherein the log file further includes variable values.

13. The method of claim 1 wherein accessing the log file comprises performing a textual search of the log file, and wherein correlating comprises performing a source code line correlation based on the results of the textual search.

14. The method of claim 1 wherein accessing the log file comprises searching the log file according to one or more fields specified by a user for a given search of the log file.

15. The method of claim 1 wherein the one or more fields each correspond to different information provided in the log file.

16. A computer program product residing on a computer-readable medium for debugging code, the computer program product comprising instructions causing a computer to:
    access from a remote site a log file, associated with a source file and in a target system, through a network connection to the target system by enabling, from the remote site, an agent in the target system to query the log file, the source file representing a non-active program;
    correlate a message in the log file to corresponding source code in the source file; and
    display the corresponding source code to enable debugging of the corresponding source code.

17. The computer program product of claim 16 wherein the instructions to display comprise instructions causing a computer to:
    display the corresponding source code in association with the message.

18. The computer program product of claim 16 wherein the message identifies an event and provides a source code identifier corresponding to the event.

19. The computer program product of claim 18 wherein the instructions to correlate comprises instructions causing a computer to:
    match the message to source code identified by the source code identifier.

20. The computer program product of claim 19 wherein the source code identifier comprises a source code line number.

21. The computer program product of claim 16 wherein the log file comprises multiple messages.

22. The computer program product of claim 21 wherein the target system supports multiple inter-related processes each corresponding to a different source file and producing a log file, further comprising instructions causing a computer to:
 initiate debug sessions involving each different source code and log file; and
 switch between two of the debug sessions.

23. The computer program product of claim 22 wherein the instructions to switch between the two debug sessions comprise instructions causing a computer to:
 time correlate messages in the log files involved in the two debug sessions.

24. The computer program product of claim 21 wherein the target system supports threads executing the source code, each thread contributing to the messages in the log file.

25. The computer program product of claim 24 wherein the instructions to correlate comprises instructions causing a computer to:
 correlate each message in the log file for a selected one of the threads to corresponding source code in the source file.

26. The computer program product of claim 25 wherein the log file further includes states associated with the threads.

27. The computer program product of claim 18 wherein the log file further includes variable values.

28. The computer program product of claim 16 wherein the instructions to access the log file comprise instructions causing a computer to perform a textual search of the log file, and wherein correlating comprises performing a source code line correlation based on the results of the textual search.

29. The computer program product of claim 16 wherein the instructions to access the log file comprise instructions causing a computer to search the log file according to one or more fields specified by a user for a given search of the log file.

30. The computer program product of claim 16 wherein the one or more fields each correspond to different information provided in the log file.

31. A debugger system for debugging code, comprising:
 means for accessing from a remote site a log file, associated with a source file and in a target system, through a network connection to the target system by enabling, from the remote site, an agent in the target system to query the log file, the source file representing a non-active program;
 means for correlating a message in the log file to corresponding source code in the source file; and
 means for displaying the corresponding source code to enable debugging of the corresponding source code.

32. An apparatus comprising:
 a processor;
 a memory storing a computer program residing on a computer-readable medium comprising instructions to cause a computer to:
  access from a remote site a log file, associated with a source file and in a target system, through a network connection to the target system by enabling, from the remote site, an agent in the target system to query the log file, the source file representing a non-active program;
  correlate a message in the log file to corresponding source code in the source file; and
  display the corresponding source code to enable debugging of the corresponding source code.

* * * * *

UNITED STATES PATENT AND TRADEMARK OFFICE
CERTIFICATE OF CORRECTION

PATENT NO. : 7,216,336 B1 Page 1 of 1
APPLICATION NO. : 10/375991
DATED : May 8, 2007
INVENTOR(S) : Ezra et al.

It is certified that error appears in the above-identified patent and that said Letters Patent is hereby corrected as shown below:

Col. 2, line 25, delete "FIG. 3 is block" and replace with -- FIG. 3 is a block --.

Col. 3, line 1, delete "executions threads 26," and replace with -- execution threads 26, --.

Signed and Sealed this

Tenth Day of June, 2008

JON W. DUDAS
*Director of the United States Patent and Trademark Office*